United States Patent

[11] 3,616,928

| [72] | Inventor | Naftali Walter Rosenblatt<br>Wilmington, Del. |
|---|---|---|
| [21] | Appl. No. | 863,216 |
| [22] | Filed | Oct. 2, 1969 |
| [45] | Patented | Nov. 2, 1971 |
| [73] | Assignee | E. I. du Pont de Nemours and Company<br>Wilmington, Del. |

[54] PERMEATION SEPARATION DEVICE FOR SEPARATING FLUIDS
3 Claims, 4 Drawing Figs.

| [52] | U.S. Cl. | 210/321, 55/158 |
|---|---|---|
| [51] | Int. Cl. | B01d 13/00 |
| [50] | Field of Search | 210/22, 23, 321; 55/158 |

[56] References Cited
UNITED STATES PATENTS

| 3,503,515 | 3/1970 | Tomsic | 210/321 |
|---|---|---|---|
| 3,536,611 | 10/1970 | Filippe et al. | 210/321 X |
| 2,880,056 | 3/1959 | Carr et al. | 25/54 |
| 3,342,729 | 9/1967 | Strand | 210/321 X |
| 3,422,008 | 1/1969 | McLain | 210/321 X |
| 3,526,001 | 8/1970 | Smith | 210/321 X |

*Primary Examiner*—Reuben Friedman
*Assistant Examiner*—Richard Barnes
*Attorney*—Gary A. Samuels

ABSTRACT: A permeation separation apparatus which comprises an enclosure containing therein a plurality of long, thin, hollow, selectively permeable crimped fibers, an inlet for introducing fluid to be separated into the enclosure, a collection chamber for removing fluid components that pass through the fiber walls into the hollow bores of the fibers, and an outlet on the enclosure for removing the rejected fluid.

PATENTED NOV 2 1971 3,616,928

INVENTOR
NAFTALI WALTER ROSENBLATT

BY Gary A. Samuels
ATTORNEY

PERMEATION SEPARATION DEVICE FOR SEPARATING FLUIDS

BACKGROUND OF THE INVENTION

1. Field of the Invention

This invention relates to an apparatus for separating fluid mixtures or solutions by selective permeation. More particularly, the invention is directed to an apparatus for separating fluid mixtures or solutions by contact under pressure with selectively permeable hollow fiber membranes.

2. Description of the Prior Art

Separation of the components of mixtures and solution by bringing them into contact with one side of a suitable thin membrane, usually under pressure, can be effected as a result of the different solubilities in, and/or rates of diffusion through, the membrane. When this procedure involves the separation of a solvent, e.g., water, from a solute, e.g., dissolved salts, by passage of the solvent through the membrane under an applied pressure greater than the osmotic pressure of the solution, the procedure is called "reverse osmosis."

Selectively permeable membranes have traditionally been employed in permeation separatory devices in the form of thin films on flat or cylindrical surfaces. More recently, such membranes have been employed in the form of long, thin-walled capillaries or hollow fibers. For example, Kohman et al., U.S. Pat No. 3,019,853 and Hicks U.S. Pat. No. 3,262,251 describe the use of glass capillary tubes for separating helium from other gases. Lewis et al. in U.S. Pat. No. 3,198,335 describe a permeation separatory device in which polymeric hollow fiber membranes are looped such that both ends of each fiber empty into a central discharge conduit. McLain in U.S. Pat. No. 3,422,008 describes a permeation separatory device in which polymeric hollow fiber membranes are wound spirally in several layers around a cylindrical core for substantially the length of the core. Strand in U.S. Pat. No. 3,342,729 describes a permeation separatory device in which hollow fiber membranes are woven in the form of a web or mesh. Mahon in U.S. Pat. Nos. 3,228,876 and 3,228,877; Maxwell et al. in U.S. Pat. No. 3,339,341; and British Pat. No. 1,019,881 all describe permeation separatory devices in which a cylindrical shell or jacket contains a plurality of long polymeric hollow fibers which extend through one or both ends of the jacket. Most of the foregoing devices are adapted for flow of the feed fluid mixture or solution to be separated around the outsides of the hollow fibers with the component to be separated permeating through the walls of the fibers and being collected from the inside bore of the fibers.

The devices described in the preceding paragraph take advantage of the inherently high strength of small, thin-walled, hollow capillaries or polymeric fibers to reduce the wall thickness and thereby increase the rate of permeation of the permeable component to be separated. They also take advantage of the large surface area per unit volume available which results from the fact that theoretically the entire circumferential outer surface of each fiber is available for exposure to the feed fluid to be separated. However, as the capillaries or long, thin-walled, hollow fibers are packed into a permeator jacket, several problems develop as a result of such packing. Firstly, increased longitudinal side-to-side contact reduces the amount of total surface area available to contact the feed fluid to be separated, thus reducing the total rate of permeation and efficiency of the apparatus. Secondly, the flow of the feed fluid to be separated around and between the fibers is hindered, thus reducing uniformity of contact of the feed fluid with the fibers. Such variations in the uniformity of flow within the device result in uneven permeation rates over the length of the device, creating localized pockets of fluid containing an increased concentration of the less-permeable components of the feed fluid. This greater concentration in turn causes increased permeation of these undesirable components which reduces the degree of separation. Also, in extreme cases the feed fluid can become so saturated with such less-permeable components that they separate or precipitate between the hollow fibers. Thirdly, most long, thin-walled, hollow fibers employed in permeation separatory devices are very flexible and difficult to assemble in stable arrangements. This is particularly so when the fibers are arranged in substantially parallel fiber bundles. Thus, in use the fibers are prone to changes in their positions relative to one another.

It is an object of this invention to provide a permeation separatory apparatus in which the major portions of the capillaries or hollow fibers are held apart and are fixed in their spatial relationship so as to maximize the amount of fiber outer surface area available for contact with the feed fluid, so as to provide substantially uniform flow of feed fluid around the fibers, and so as to provide fibers that are substantially in fixed spatial relationship to one another. This and other objects will become apparent hereinafter.

SUMMARY OF THE INVENTION

In an apparatus for selectively separating permeable components of a fluid which apparatus comprises a fluidtight enclosure containing a plurality of selectively permeable hollow fibers, means on said enclosure for introducing into said enclosure a fluid mixture or solution to be separated, means on said enclosure for removing fluid that does not pass through the walls of said hollow fibers, and receptacle means communicating with the inside bores of said hollow fibers but not communicating with the inside of said enclosure for removing fluid components that pass through the walls of said fibers from the inside bores of said fibers and from said enclosure; the improvement in which each hollow fiber is crimped along its longitudinal axis such that the longitudinal geometric configuration of the fiber comprises a plurality of irregular bends.

DESCRIPTION OF THE INVENTION

Figure 1:
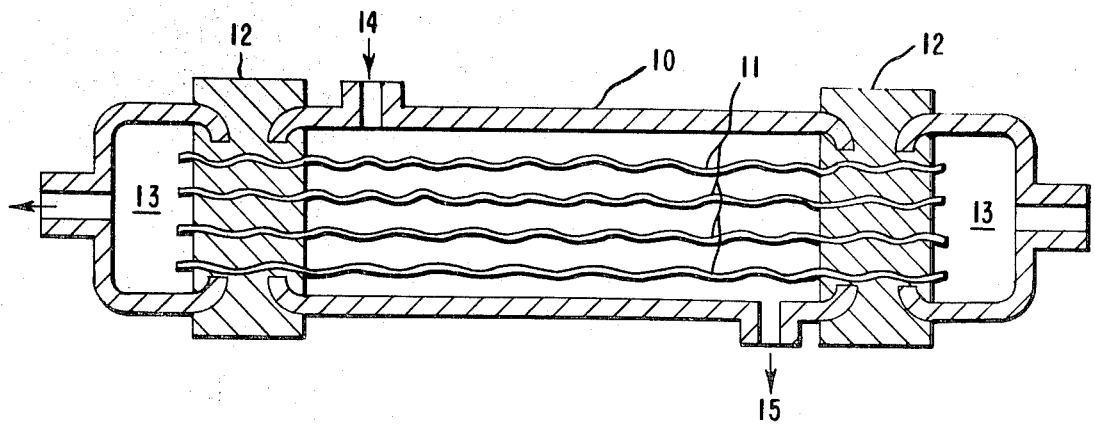
FIG. 1 illustrates a simple permeator arrangement for practicing the principles of the invention.

Various glass or polymeric materials can be used for making the hollow crimped fibers suitable for use in the apparatus of this invention. The particular fiber employed in the permeation separatory device will depend on the particular separation to be achieved. For instance, hydrophilic materials are usually preferred for desalination or separation of water, while hydrophobic materials will usually be preferred for the separation of components of mixtures of organic chemicals or for the separation of gaseous mixtures. Examples of hydrophilic materials which can be made into crimped hollow fibers include the esters and ethers of cellulose such as the acetate or propionate esters and the methyl and ethyl ethers in various degrees of substitution, regenerated cellulose, polyvinyl alcohol, caseins, polysaccharides and various derivatives thereof. Examples of hydrophobic materials which can be made into crimped hollow fibers include synthetic linear polyamides and polyesters, polyvinyl chloride and its ordinary copolymers, polycarbonates, acrylic ester polymers, polystyrene and its usual copolymers, and polyolefins such as polyethylene or polypropylene.

The hollow fibers may be prepared by melt extrusion through circular dies as taught in French Pat. No. 990,726 and British Pat. No. 859,814. Hollow fibers of textile size are preferably made by melt-spinning the polymer, e.g., nylon 66, with a screw melter, a sand filter pack, and a sheath-core spinneret of the type shown in U.S. Pat. No. 2,999,296. Fibers of suitable size are obtained with spinnerets having plate hole diameters near 40 mils and insert diameters near 35 mils by adjustment of melter, sand pack and spinneret temperatures, air quench and windup speed.

It is generally preferred that the hollow fibers employed herein have outside diameters of about 10–250 microns and wall thicknesses of about 2–75 microns. More preferably, they will have outside diameters of about 15–150 microns and wall thicknesses of about 5–40 microns. The fibers with smaller outside diameters in general should have thinner walls so that the ratio of the cross-sectional area of the internal bore to the total cross-sectional area within the outer perimeter of the fiber is about 0.12:1 to about 0.60:1, preferably about 0.18:1 to about 0.45:1.

Procedures for crimping the above-discussed hollow fibers are, in general, those procedures that have been employed in the crimping (or bulking, as it is sometimes called) of synthetic textile fibers. Preferably, the hollow fibers, especially polyamide fibers, are crimped in a hot air jet followed by relaxing the fibers by exposure to boiling water or steam. These procedures are described in Breen U.S. Pat. No. 2,783,609 and Hallden et al. U.S. Pat. No. 3,005,251.

Particular hollow fibers may be crimped in particular fashions. For instance, the hollow fibers may be coated with a sheath or film of a second polymer having the same permeation properties as the hollow fibers, followed by fusing, supercooling and stretching, as described in Carr U.S. Pat. No. 2,880,056. Highly crystalline hollow fibers may be crimped by heating one surface to make it more amorphous than adjacent surfaces, followed by stretching and relaxing as described in Rokosz U.S. Pat. No. 2,917,805. Polyolefin hollow fibers may be crimped by the asymmetric cooling of hot, freshly melt-spun fibers as described in British Pat. No. 1,137,027.

Other crimping techniques which may be employed in preparing the crimped hollow fibers useful in the apparatus of this invention include passing the fibers between heated gears or embossed rolls, as in gear box crimping, or passing the fibers through heated chambers, as in stuffer box crimping.

The crimped hollow fibers prepared as described above may be assembled into permeation separatory apparatus of any of the types discussed above in the Background section by using them in place of the uncrimped fibers described therein. The crimped hollow fibers are especially useful in permeation separatory devices that employ the hollow fibers in longitudinal bundles in which the mean axes of the fibers are substantially parallel. Such devices are described in Maxwell et al. U.S. Pat. No. 3,339,341; Mahon U.S. Pat. Nos. 3,228,877 and 3,288,876; British Pat. No. 1,019,881; and Carocciolo U.S. Ser. No. 779,055 and Smith U.S. Ser. No. 779,006, both filed Nov. 26, 1968 and both assigned to the assignee herein. Embodiments of such permeation separatory devices are shown in the drawings.

FIG. 1 depicts a cross-sectional view of a device having a fluidtight jacket 10, a plurality of long, crimped hollow fibers 11 extending the length of the jacket and extending through fluidtight, cast walls 12 at both ends of the jacket into receiving chambers 13. Fluid to be separated enters into the jacket interior at inlet 14. That portion of the fluid permeating through the walls of the hollow fibers is drawn off through chambers 13 while reject fluid exits through port 15.

Figure 2:
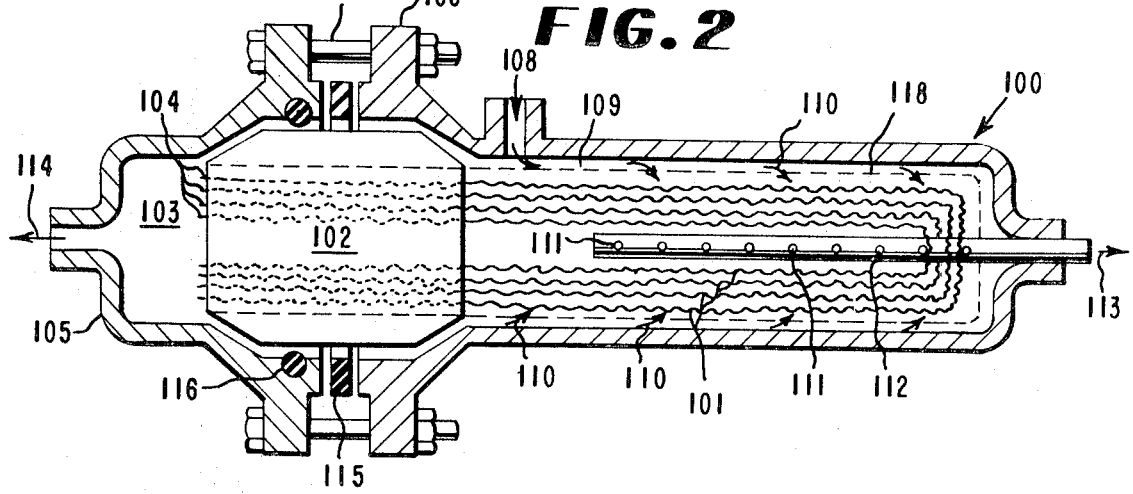
FIG. 2 illustrates one embodiment of permeation separatory apparatus of this invention.

Referring now to FIG. 2, a hollow fiber bundle containing a plurality of individual crimped hollow fibers 101 is positioned inside jacket 100. The fibers are surrounded by a flexible porous sleeve 118. The fibers are looped at one end of the jacket so that both ends of each fiber extend through cast wall block 102 and open into chamber 103 at 104. Chamber 103 is formed by outer closure member 105 which is constructed to abut portions of the cast wall block 102 and jacket 100, and is rigidly attached thereto by flanges 106 and bolts 107. Gasket seal 115 and O-ring 116 provide fluidtight seals. A feed fluid is introduced at 108 into the jacket 100 under pressure and flows along annular ring space 109 between the outer fiber bundle sleeve 118 and the interior wall of jacket 100. Once the annular space 109 is filled with fluid, the feed flows radially (perpendicularly) across the fibers as represented by arrows, some of which are denoted by 110, toward the exit perforations, some of which are denoted by 111, along perforated exit tube 112. All of the reject fluid (fluid remaining after the permeate fluid has passed through the fiber walls) must exit through these perforations and thence to exit 113 where a pressure letdown device (not shown) allows it to leave the apparatus at atmospheric (or other desired) pressure. The permeate which penetrated the fiber walls flows through the hollow fiber interior bores and exits from the open fiber ends at 104 into chamber 103 and leaves the chamber at exit 114.

The presence of the annular ring and evenly spaced perforations has the effect of forcing crossflow (flow of entrance fluid perpendicular to the longitudinal axis of the hollow fibers) to provide mixing in a radial direction (a direction perpendicular to the length of the fibers) of fluid within the jacket, thus alleviating the effects of blanked flow paths and pockets of no-flow in the axial direction (along the axis of the fibers). In this way, efficient use is made of the maximum amount of fiber surface. However, the presence of the annular ring is not essential.

In reverse osmosis separation operations, the crimped hollow fibers are packed into the jacket with means for introducing a fluid feed (typically a naturally occurring water which contains dissolved salts such as sodium sulfate, sodium chloride, magnesium chloride, magnesium sulfate or many others in various proportions) at a point near one end of the fiber bundle under pressure. In the case of such aqueous solutions, water passes through the walls of the hollow fibers more rapidly than will the dissolved salts. Purified water solution then exits from the open ends of the hollow fibers, and the remaining solution, having been rejected by the fiber walls, is enriched in the dissolved salts, and is allowed to exit from the jacket, for example, through the exit port. Such permeation devices have been constructed and tested in sizes from fractions of an inch in diameter to 12 and 14 inches in diameter or more. The available surface area of the outside surface of the hollow fibers in a 12 inch-diameter apparatus, several feet long, can be as much as 75,000 to 100,000 square feet.

The jacket of the apparatus may be made with any suitable transverse cross-sectional configuration and of any suitable compatible material of sufficient strength. Preferably the jacket is cylindrical. Cylindrical metallic housings, for example, steel pipe, are satisfactory, being reasonably easy to produce and assemble. The size of the tubular jacket may vary from less than one inch to many inches in diameter, e.g., 10 or 14 inches, and may vary from about one to many feet in length, e.g., 10 or 14 feet. The most convenient configuration of the hollow fibers inside the jacket is that wherein the fibers form a U-shape, as shown in FIG. 2, so that both ends of the fibers exit from the jacket at the same end thereof. Such a configuration can be conveniently obtained by spinning or extruding the hollow fiber into one continuous yarn or filament, crimping the filaments and winding them to form a hank of a desired length and width (which will depend upon the length and width of the jacket). The preparation of the hanks is described in detail in Maxwell et al. U.S. Pat. No. 3,339,341. The hanks are drawn and elongated by means of hooks and a flexible porous sleeve or sleeves pulled over the elongated hank to aid in subsequent handling of the fiber bundle.

The flexible porous sleeves which are drawn over the loose hanks may be made of any suitable material, natural, reconstituted, or synthetic, of suitable strength and compatible with the fluid mixture being handled, the polymer from which the hollow filaments are made, the material forming the cast wall members, and the other materials with which the sleeve will come in contact. The sleeve members may be of any practical construction which is porous and flexible. Preferably the sleeve members should be of a strong abrasion resistant material, or a construction, which is capable of shrinkage or shortening at least in the transverse peripheral dimension to give a uniform constraining compacting action on and along an enclosed bundle or group of filaments. A preferred construction is a circularly knit fabric sleeve of a suitable material such as cotton thread or a polyester fabric, for example, which sleeve is capable of considerable reduction in transverse peripheral dimension when the sleeve is placed under tension longitudinally. This sleeve is especially advantageous, for when tension is exerted on such a sleeve surrounding a bundle to pull a filament bundle into a tubular jacket, the tension also results in uniformly compacting and reducing the bundle cross section along the bundle length to facilitate positioning the bundle in such a jacket without damaging the filaments of the bundle. The sleeves may also be made of woven or nonwoven fabric, or of punched or cut cylindrical tubes, or tubes of netting. The ability of the sleeve member to shrink or reduce its radius or circumference uniformly and evenly is desirable.

Once the sleeve or sleeves are placed around the fiber bundle hank, one end of the hank is placed in a suitable mold while a solidifiable material is molded around that end of the hank to form the cast wall member or block. A large variety of plastics such as polyester, phenolics, melamines, silicones and others are suitable as solidifiable resins, although epoxy resin is preferred. A suitable molding resin which provides good strength is a mixture of an epoxy polymer modified with butyl glycidyl ether, a modified aliphatic amine adduct and triphenyl phosphite. After solidification, the "potted" hank is removed from the mold. The "pot" or cast wall member can then be sliced or cut, as described in Maxwell et al. U.S. Pat. No. 3,339,341 and Geary et al., U.S. Pat. No. 3,442,002, so that the open ends of the hollow fibers communicate with the atmosphere.

The cast wall block is thereafter handled as a unit, the individual bundles of hollow fibers being constrained to a large bundle for ease in handling. The cast wall block may be backed up by a sturdy metal cap of the same diameter if desired which provides increased strength to resist the pressure of the feed fluid inside the jacket of the permeation apparatus. The metal cap is separated from the surface containing the open ends of the hollow fibers by a space such as a screen to allow free flow of the permeate from the fiber openings to the exit conduit of the permeate collection chamber. The cast wall block is originally of a larger diameter than the jacket making up the body of the apparatus, the connection between the block and jacket being made through a flanged or welded reducer. The jacket is sized so that the hollow fiber bundle will fit as a unit in the jacket, deriving support from the side walls and effectively delimiting the open feed channels between adjacent hollow-fiber walls. The looped ends of the bundled fibers (at the end away from the epoxy cast wall block) may be drawn into the jacket, and the other end of the jacket attached to the outer closure member by welding or by flanged fitting.

Optionally, and prior to fitting the fiber bundle in the jacket, a perforated tube (shown as 113 in FIG. 2) may be inserted longitudinally along the axis of the bundle in about the center of the bundle. Most conveniently, a sleeve, of the same construction as the sleeves surrounding the bundle but of a smaller diameter, is placed in the fiber bundle along its longitudinal center axis during formation of the bundle. This sleeve aids in the insertion of the perforated tube since the tube can be inserted inside the sleeve and pushed into the bundle without difficulty by using the sleeve as a guide. The sleeve may be permanently cast in the cast wall block or may be affixed to the tube itself. The use of the perforated tube aids in directing fluid flow and may be any suitable length. It will preferably extend into the bundle for almost the length of the fiber bundle. For devices of commercial size, i.e., 4 to 14 inches diameter or more, the tube may be of one-quarter to 1 inch diameter, or even larger as larger permeation bundles are utilized. The exist ports in the tube may be as small as 1 to 200 microns in diameter, or as large as one sixty-fourth, one-eighth or one-quarter inch in diameter in larger devices. The perforations in the exit tube must be small enough and few enough to limit flow from the bundle to the inside of the tube. There is some reduction in pressure in passing fluid from the bundle through the exit ports to the bore of the reject exit tube. It is this pressure difference that provides the aspirating action which tends to equalize flow over the length of the bundle and promotes uniform contact throughout. Preferably the perforations are evenly spaced along the portion of the tube within the bundle and are of a uniform size in order to promote even flow of feed fluid radially across all portions of the bundle. The number of perforations is not limited to any maximum number or minimum number. The tube may be fabricated from any material resistant to corrosion, e.g., inert plastic, fiber glass, ceramic wear, or steel. When the perforations are of small size, measured in microns, the tube may be made of linear, high-density polyethylene (having pores 35-100 microns in size) or sintered stainless steel (having pores 1-200 microns in size).

Preferably, the bundle of fibers is wrapped tightly with the flexible sleeve (although, alternatively, metal, cloth tape, rope or screen may be used) and the bundle firmly secured against the perforated exit tube, thus forming a rather stiff unit which leaves an annular space of about one thirty-second to three-quarters inch between the interior wall of the jacket and the outermost portion of the fiber bundle. For ultimate performance, perforation spacing may be varied by adjusting for the decrease in driving force caused by increased pressure inside the hollow fibers. Excellent results are obtained by locating 36-40 percent of the perforations in the top one-third of the exit tube, 32-34 percent of the perforations in the middle one-third, and 28-30 percent of the perforations in the bottom one-third, where reject flow in the tube is from the top toward the bottom. Since the feed fluid completely and uniformly surrounds the hollow fiber bundle, no matter where it is introduced, there is no difference in operation wherever the feed port is located. It may be located at any point on the jacket of the device, or through a concentric tube so long as the feed is introduced to the annulus rather than within the fiber bundle.

In the radial flow created by the preferred apparatus of this invention, i.e., that containing an annular space, flow resistance in the annulus must be small compared to flow resistance in the fiber bundle. Or, to state the foregoing alternatively, the pressure drop (difference in fluid feed pressure at the inlet point and the point in question) must be smaller in the annulus than in the fiber bundle. Moreover, since flow will occur at the regions of greatest pressure drop, the pressure drop will be greatest at the exit ports of the perforated exit tube. Thus, by regulating the size and distance between the exit perforations, fluid flow can be directed and controlled.

Once the optional perforated tube is in place in the bundle, the bundle is drawn, looped end first, into the jacket. The cast wall block end of the bundle is fitted into the jacket to close that end and the outer closure member fitted to the jacket. Likewise, the portion of the perforated tube protruding from the opposite end of the jacket is sealed to the jacket by welding or suitable flanges and gaskets.

Preparation of the apparatus, especially the fibers, cast end block, and procedures of assembly are further described in Maxwell et al. U.S. Pat. No. 3,339,341 and Geary et al. U.S. Pat. No. 3,442,002.

Figure 3:
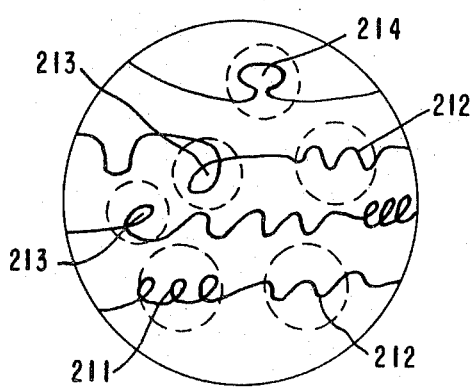
FIG. 3 illustrates a portion of adjacent crimped hollow fibers.

The benefits obtained from the use of the crimped, long hollow fibers result from the random three-dimensional curvilinear configuration of each hollow fiber in the bundle. The curvilinear configuration includes coils, waves, loops or whorls at random intervals along the length of the hollow fiber. FIG. 3 is an enlarged view of a portion of several adjacent hollow fibers which contain such coils 211, waves 212, loops 213, and whorls 214.

The crimped hollow fibers will remain spaced apart over the major portions of the outer surfaces, thus allowing contact by a mixture to be separated over a large portion of the fiber outer surfaces, i.e., the crimped configuration of the fibers prevents parallel abutting side-by-side alignment of adjacent fibers for any length more than lengths several times the diameter of the fiber at random places along the fibers.

Figure 4:
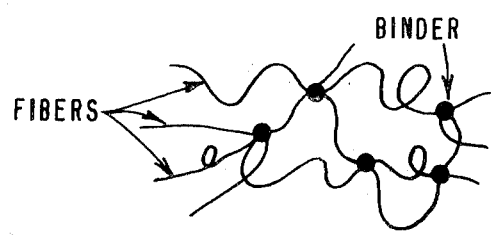
FIG. 4 illustrates a portion of adjacent crimped hollow fibers containing bonding adhesive at their abutting points.

It is sometimes beneficial to bond the crimped hollow fibers at the abutting portions of adjacent fibers in order to reinforce their structure and provide permanent spatial three-dimensional relationships. Any technique for bonding textile polymers of the type chosen for fabrication of the hollow fibers for use in this invention may be employed so long as the bonding process does not break or damage the fibers and so long as the bonding material does not excessively reduce the permeability properties of the fibers. Such bonding is preferably carried out before insertion of the fiber bundle in the permeator jacket. As a result of the bonding process, the fibers are physically bonded together at their points of abutting contact. FIG. 4 depicts a portion of the lengths of several fibers that are bonded at their points of contact with bonding material.

One bonding method is described generally in Ostmann, Jr. U.S. Pat. No. 3,369,948 by bonding the fiber with another polymer (called a binder polymer) that is structurally similar to the fiber polymer but which melts at a lower temperature. The binder polymer, melting first, forms droplets which collect at the abutting points of the fibers. On cooling then, the fibers become bonded at their abutting surfaces. Another bonding method is described in Koller U.S. Pat. No. 3,085,922.

Mechanical interlocking of fibers can be employed in place of adhesive bonding. Such techniques as needling or stitching are described in British Pat. Nos. 1,016,551 and 1,085,097.

The following examples serve to illustrate the invention in greater detail:

EXAMPLE 1

Undrawn hollow fibers on "Zytel" 43 nylon 66 with outside diameter of about 45 microns and inside bore diameters of about 22 microns were crimped by passing a thread of 72 filaments of the fiber about a heated drum at 135° C. seven times, then passing it at a rate of about 50 yards per minute through a jet along with air heated to between 235°-310° C. flowing under a pressure of between 40-90 pounds per square inch gauge in an apparatus described in Hallden et al. U.S. Pat. No. 3,005,251. The thread was then relaxed by exposure to steam at 102°-105° C. for 5 to 10 minutes.

EXAMPLE 2

A continuous thread of 72 filaments of hollow "Zytel" 43 nylon 66 fibers, crimped as described in example 1 with an air temperature of 265° C. and an air pressure of 80 p.s.i.g., was wound four times around a reel and the resulting hank was stretched as described in Maxwell et al. U.S. Pat. No. 3,339,341 to obtain a bundle about 14 inches long of 576 filaments, except that the bundle was U-shaped and the fibers were inside a continuous tube instead of two tubes. One end of a 14-inch bundle of crimped fibers was threaded into a J-shaped piece of nominal 0.25-inch copper tubing about 4.5 inches long, with a coupling on the longer end, leaving about 8.5 inches extending from the coupling for an exposed surface area of 0.209 square feet. The bundle was sealed into the tube by putting about 5 milliliters of an epoxy formulation into the shorter end of the tube. After immersing the exposed part of the bundle in boiling water, drying, and treating with formic acid, the bundle was drawn into a 12-inch piece of copper tubing which had a T-tube inlet near a matching coupling at one end and a pressure control valve at the other end. This assembly was used in the permeation separation test. The epoxy resin used was a mixture of 25 parts by weight of "Epi-rez" 504, an epoxy formulation modified with butyl glycidyl ether as a reactive diluent, and four parts of "Epicure" 874, an accelerated aliphatic amine curing agent. Keeping the fibers wet with water, they were assembled into a miniature reverse osmosis desalination apparatus as described in Cescon et al. U.S. Ser. No. 674,425, filed Oct. 11, 1967. The apparatus was used to desalt a synthetic brackish water containing 700 parts per million calcium sulfate, 400 p.p.m. sodium sulfate, and 400 p.p.m. magnesium sulfate. With the water passed outside the crimped hollow fibers at 600 p.s.i.g. and at low conversion, the crimped hollow fibers showed a water permeability of 77 and a salt rejection of 99 percent. Upon dismantling the apparatus, it was observed that the collection of crimped hollow fibers retained its original resilient open structure and was more bulky than similarly treated hanks of uncrimped hollow fibers.

EXAMPLE 3

A collection of four threads of 72 filaments each of hollow "Zytel" 43 nylon 66 fibers, crimped as described in example 1 with an air temperature of 265° C. and an air pressure of 90 p.s.i.g., was steamed for 5 minutes at 102°-105° C. and air dried. The filaments had appreciable crimp and bulkiness. This collection of crimped hollow fibers was passed continuously through an isopropanol solution containing 3.3 grams per 100 milliliters of nylon 819, an alkoxy-alkyl nylon (Belding Corticelli Industries), and 0.14 gram per 100 milliliters of paratoluenesulfonic acid. The fibers were then passed between wringer rollers, heated with a hot-air gun to evaporate the solvent, wound on a spool, and heated for 30 minutes at 100° C. to cure the binder resin. Microscopic examination showed that the binder resin tended to accumulate at contact points between the filaments and that the filaments were essentially free of deposits of the binder resin elsewhere. Binder pickup was about 5- 10 percent. These crimped and bonded hollow fibers were assembled into a miniature reverse osmosis desalination apparatus as described in example 2, treated with 16.2 molar formic acid for 15 minutes at 30° C., rinsed copiously, and used to desalt synthetic brackish water containing 1,500 p.p.m. mixed sulfate salts. The treated crimped and bonded hollow fibers had a water permeability of 330 and a salt rejection of 85 percent.

EXAMPLE 4

Hollow fibers of "Zytel" 43 nylon 66 were crimped as described in example 1 using air at 280° C. and an air pressure of 90 p.s.i.g., and were then steamed for 5 minutes at 102-105 ° C. A single thread of 72 filaments of this crimped fiber was wound on a reel for 525 turns and stretched to obtain a bundle about 1.5 feet long. This bundle was placed inside a 1.5-inch inside diameter tube and the bundle and tube were immersed in an isopropanol solution of 3.0 grams per 100 milliliters of nylon 819. The bundle of crimped hollow fibers was withdrawn from the solution at a rate of about one foot per hour through a 10-inch portion of the tube to permit draining of the binder solution and then heated with a hot-air gun to evaporate the solvent. The resulting structure was uniformly bonded and shape-retaining but resilient. This structure was compressed and inserted into a transparent plastic tube of ⅞-inch inside diameter. With one end fastened inside the tube with epoxy resin, water was passed at increasing rates down the tube toward the free end of the bundle and along its free length of about 28 centimeters. A shortening of the bundle because of compaction was first observed when the pressure drop of the water flowing down the tube was 38 pounds per square inch or 1.36 pounds per centimeter of bundle length. In a second experiment with a similar bundle of the same crimped fibers which had not been bonded, the bundle began to compact when the pressure drop of the water flowing down the tube was 0.88 pounds per centimeter of bundle length. In a third experiment with a bundle of the same hollow fibers which had been neither crimped nor bonded, the bundle began to compact when the pressure drop of the water flowing down the tube was 0.18 pounds per centimeter of bundle length. These results show the resilience of crimped and bonded hollow fibers, and also their increased resistance to compaction when exposed to fluid flow.

The apparatus of this invention may be located and operated in a horizontal, vertical, or an intermediate position with respect to ground level. The construction of the apparatus wherein both ends of the fibers are suspended from the single cast wall members, as described herein, offers unusual advantages, especially in gaseous separations, when operated in a vertical position. Gaseous feeds from which hydrogen or other gas is to be separated frequently contain a relatively high proportion of hydrocarbons in the $C_1$ to $C_{10}$ range. Under the conditions of elevated pressure and gradual removal of hydrogen inside the permeation separation device (the feed being outside the polymeric hollow fibers), these hydrocarbons tend to condense within the fiber bundle, blocking the fluid passageways and decreasing the permeation efficiency. Vertical operation of the device uses the force of gravity to facilitate drainage of the condensate from the fiber bundle to the bottom of the device whence it can be easily removed.

When operating with certain liquid feeds, for example, water containing impurities in the form of bicarbonates, sulfates or water containing dissolved gases, similar advantages are gained. Noncondensible gases are more easily freed from interstices in the bundled fibers and can be vented from the top of the device. Vertical operation with liquid feed also helps to cancel out any pockets or dead spaces in the fiber bundle, as the force of gravity tends to urge liquid flow through such areas where horizontal operation might allow settling, salt precipitation and other undesirable developments. The flow-directing devices of the instant invention improve performance in both horizontal and vertical installations.

Treated polyamide hollow fibers are effective to produce potable water in most communities having brackish sulfate water supplies containing more than 250 p.p.m. sulfate impurity level. The hollow fibers can be used to remove a wide variety of other materials from aqueous mixtures. Typical components which can be separated from liquid mixtures containing water using the treated membranes taught herein include inorganic salts containing anions such as sulfate, phosphate, fluoride, bromide, chloride, nitrate, chromate, borate, carbonate, bicarbonate and thiosulfate, and cations such as sodium, potassium, magnesium, calcium, ferrous, ferric manganous and cupric; organic materials such as glucose, phenols, sulfonated aromatics, lignin, alcohols and dyes; and difficulty filterable insoluble materials including viruses and bacteria such as coliform and aerogene. Specific applications for these separations include the purification of saline brackish and waste waters; recovery of minerals from sea water; water softening, artificial kidney; sterilization; isolation of virus bacteria; fractionation of blood; and concentration of alkaloids, glucosides, serums, hormones, vitamins; vaccines, amino acids, antiserums, antiseptics, proteins, organometallic compounds, antibiotics, fruit and vegetable juices, sugar solutions, milk, and extracts of coffee and tea, as well as many others. Preferably the treated polyamide hollow fiber membranes described herein are used to purify water containing one or more dissolved inorganic salts, and most preferably sulfate or phosphate salts.

A preferred permeation separation apparatus of this invention comprises in combination:

A. an elongated fluidtight jacket, having an open first end and a second end closed by said jacket,
said first end closed by a fluidtight cast wall member;

B. a plurality of crimped hollow fibers positioned longitudinally within said elongated jacket,
said fibers extending substantially the length of said jacket and forming a loop adjacent the second closed end of said jacket with both ends of each of said fibers embedded in and extending through said cast wall member in fluidtight relationship thereto,
said fibers comprising a bundle surrounded by at least one elongated flexible porous sleeve member extending longitudinally the substantial length of said bundle, said fiber bundle positioned within said jacket such that the elongated flexible porous sleeve surrounding said fibers is spaced uniformly away from the interior walls of said jacket;

C. an outer closure member cooperating with said jacket and said cast wall member which, with said cast wall member, defines a chamber that is in communication with the open ends of each hollow fiber;

D. a multiply perforated tube extending through at least one end of said jacket in fluidtight relationship thereto, said tube positioned within said bundle along approximately the center axis of said bundle and extending substantially the longitudinal length of said bundle,
the perforations of said perforated tube being spaced around the circumference of said tube and along the length of the portion of said tube that is within said bundle,
said tube constructed and arranged such that its interior communicates with the interior of said jacket only at the openings provided by said perforations, and such that its interior does not communicate with the chamber defined by said outer closure member and said cast wall member;

E. said jacket having conduit means to permit movement of fluid between the interior of said jacket and an area outside said jacket; and F. said outer closure member having conduit means to permit movement of fluid out of the chamber defined by said outer closure member and said cast wall member.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. In an apparatus for selectively separating permeable components of a fluid, which apparatus comprises a fluidtight enclosure containing a plurality of selectively permeable long hollow fibers, means on said enclosure for introducing into said enclosure a fluid mixture or solution to be separated, means on said enclosure for removing fluid that does not pass through the walls of said hollow fibers, and receptacle means communicating with the interior bores of said hollow fibers but not communicating with the inside of said enclosure whereby the fluid components that pass through the walls of the hollow fibers are removed, the improvements in which each hollow fiber is polymeric and crimped along its longitudinal axis such that the longitudinal geometric configuration of the fiber comprises a plurality of irregular bends, and the plurality of hollow fibers are aligned in substantially parallel relationship to one another and are maintained in substantially rigid relationship with one another by positioning them closely adjacent one another such that random portions of said fibers abut one another, and by providing an adhesive bond at a plurality of such abutting portions.

2. The apparatus of claim 1 wherein the hollow fibers are polyamide hollow fibers.

3. A permeation separation apparatus which comprises in combination,

A. an elongated fluidtight jacket having a first end closed by a fluidtight cast wall member and a second end closed by said jacket;

B. a plurality of selectively permeable crimped hollow fibers positioned longitudinally within said elongated jacket,
said fibers extending substantially the length of said jacket and forming a loop adjacent the second closed end of said jacket with both ends of each of said fibers embedded in and extending through said cast wall member in fluidtight relationship thereto,
said fibers comprising a bundle surrounded by at least one elongated flexible porous sleeve member extending longitudinally the substantial length of said bundle,
said fibers being maintained in substantially rigid relationship with one another by positioning them closely adjacent one another such that random portions of said fibers abut one another, and by providing an adhesive bond at a plurality of such abutting portions, said fiber bundle positioned within said jacket such that the elongated flexible porous sleeve surrounding said fibers in spaced away from the interior walls of said jacket;

C. an outer closure member cooperating with said jacket and said cast wall member which, with said cast wall member, defines a chamber that is in communication with the open ends of each hollow fiber;

D. a multiply perforated tube extending through at least one end of said jacket in fluidtight relationship thereto, said tube positioned within said bundle along approximately the center axis of said bundle and extending substantially the longitudinal length of said bundle, the perforations of said perforated tube being spaced around the circumference of said tube and along the length of the portion of said tube that is within said bundle, said tube constructed and arranged such that its interior communicates with the interior of said jacket only at the openings provided by said perforations, and such that its interior does not communicate with the chamber defined by said outer closure member and said cast wall member;

E. conduit means on said jacket having to permit movement of fluid between the interior of said jacket, and an area outside said jacket; and F. conduit means on said outer closure member having to permit movement of fluid out of the chamber defined by said outer closure member and said cast wall member.